(12) United States Patent
Morita

(10) Patent No.: US 6,275,984 B1
(45) Date of Patent: *Aug. 14, 2001

(54) SYSTEM AND METHOD FOR DELAYING INDIRECT REGISTER OFFSET RESOLUTION

(75) Inventor: Toshiyasu Morita, Redwood City, CA (US)

(73) Assignee: Sega of America, Inc., Redwood City, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/197,273

(22) Filed: Nov. 20, 1998

(51) Int. Cl.[7] .................................................. G06F 9/44
(52) U.S. Cl. ........................ 717/5; 717/9; 717/8; 717/7
(58) Field of Search ...................... 717/5, 9, 8, 7

(56) References Cited

U.S. PATENT DOCUMENTS

| | | | |
|---|---|---|---|
| 3,878,513 | * 4/1975 | Werner | 711/154 |
| 4,758,881 | 7/1988 | Laspada . | |
| 4,935,867 | 6/1990 | Wang et al. . | |
| 4,941,085 | 7/1990 | Sakamura et al. . | |
| 5,047,917 | * 9/1991 | Athas et al. | 709/303 |
| 5,144,692 | * 9/1992 | Baker et al. | 710/240 |
| 5,226,129 | 7/1993 | Ooi et al. . | |
| 5,386,569 | * 1/1995 | Harada et al. | 395/707 |
| 5,450,575 | * 9/1995 | Sites | 395/707 |
| 5,526,501 | 6/1996 | Shams . | |
| 5,574,521 | * 11/1996 | Constable et al. | 396/315 |
| 5,577,256 | * 11/1996 | Muramatsu et al. | 712/27 |
| 5,640,524 | * 6/1997 | Beard et al. | 712/222 |
| 5,659,706 | * 8/1997 | Beard et al. | 711/125 |
| 5,717,881 | * 2/1998 | Beard et al. | 712/205 |
| 5,797,014 | * 8/1998 | Gheith | 395/710 |
| 5,889,995 | * 3/1999 | Segnan | 395/705 |
| 5,946,484 | * 8/1999 | Brandes | 395/702 |
| 6,071,317 | * 6/2000 | Nagel | 717/4 |

OTHER PUBLICATIONS

Advanced Compiler Design and Implementation, Steven S. Munick, Aug. 19, 1997 Chapter 20 Optimization for the Memory Hierarchy.*

Compilers Principles, Techniques, and Tools, Aho et al. Sep. 12, 1985 Chapters 1 and 7.*

Free Software Foundation, GNU CC compiler source code, filename "regmove.c", 1998, Cambridge, MA 02139 USA.

Review Notes: Pointers in C++, http://www.laurentian.ca/www/math/badams/cosc1047/pointers/pointers.htm, Jul. 7, 1998, pp. 1–11.

"Indirect Addreing," http:/www.c3.lanl.gov/~dquinlan/Quick ReferenceManual/node27.html, Jan. 29, 1998, p. 1.

Overview, "Inside Macintosh: Mac OS Runtime Architectures," Chapter 2 –Indirect Addressing in the CFM–Based Architecture, http://devworld.apple.com/dev/techsupport/insidemac/runtimehtml/RTArch–28.htm, Nov. 7, 1997, pp. 1–5.

(List continued on next page.)

Primary Examiner—Mark R. Powell
Assistant Examiner—Todd Ingberg
(74) Attorney, Agent, or Firm—Finnegan, Henderson, Farabow, Garrett & Dunner, L.L.P.

(57) ABSTRACT

A system and method for delaying indirect register offset resolution including a processor having a plurality of registers, a memory storing program instructions, and a compiler for translating the program instructions into executable object code for execution by the processor. In addition, the invention includes a set of offset register lists for storing offset values generated by the compiler.

23 Claims, 12 Drawing Sheets

OTHER PUBLICATIONS

Review Notes: Pointers in C++, http://www.laurentian.ca/www/math/badams/cosc1047/pointers/pointers.htm, Dec. 28, 1996, pp. 1–13.

"Direct addressing versus register indirect," http://www.cs.strath.ac.uk/teaching/ug/classes/223/prac2/node2.html, Oct. 22, 1996, p. 1.

Lecture 6, hppt://ww.ee.umd.edu/~yavuz/enee3501lec6.html, Sep. 18, 1995, pp. 1–3.

"indirect address," http://www.realtime–info.be/encyc/techno/terms/93/44.htm, Nov. 7, 1994, pp. 1–2.

* cited by examiner

| 1 | Func: | mov.l | @(84,r4),r8 |
|---|---|---|---|
| 2 | | mov.l | @(80,r4),r9 |
| 3 | | mov.l | @(76,r4),r10 |
| 4 | | mov.l | @(204,r4),r11 |
| 5 | | mov.l | @(200,r4),r12 |

FIG. 6a

| 1 | Func: | add | #76,r4 |
|---|---|---|---|
| 2 | | mov.l | @(8,r4),r8 |
| 3 | | mov.l | @(4,r4),r9 |
| 4 | | mov.l | @(0,r4),r10 |
| 5 | | add | #-76,r4 |
| 6 | | add | #200,r4 |
| 7 | | mov.l | @(4,r4),r11 |
| 8 | | mov.l | @(0,r4),r12 |
| 9 | | add | #-200,r4 |

FIG. 6b

| 1 | Func: | add | #84,r4 |
|---|---|---|---|
| 2 | | mov.l | @r4,r8 |
| 3 | | add | #-4,r4 |
| 4 | | mov.l | @r4,r9 |
| 5 | | add | #-4,r4 |
| 6 | | mov.l | @r4,r10 |
| 7 | | add | #126,r4 |
| 8 | | mov.l | @r4,r11 |
| 9 | | add | #-4,r4 |
| 10 | | mov.l | @r4,r12 |

FIG. 6c ative address is 1032, and the contents of memory address 1032 is moved into r8.

SYSTEM AND METHOD FOR DELAYING INDIRECT REGISTER OFFSET RESOLUTION

BACKGROUND OF THE INVENTION

1. Field of the Invention

This invention relates generally to the execution of instructions by computer systems and more particularly to delaying indirect register offset resolution in a computer.

2. Description of the Background Art

Implementing an efficient and effective method for the utilization of registers in compilers to generate "good code" (code that is accurate, efficient, and fast) is a significant consideration of system designers and manufacturers. However, the techniques for register utilization in reduced instruction word compilers often produce cumbersome and slow object code.

Compilers are used to translate high-level languages, such as Pascal or C++, into executable object code. Typically, the compiler achieves this translation in a series of phases or passes through the code. First, the compiler translates the high-level language source code into intermediate code (usually, assembler code), which may take one or more passes through the code. The compiler then optimizes the intermediate code into assembler code. The optimization may be accomplished in one or more passes through the code. Finally, the compiler translates the output of the optimization phases into object code that is suitable for execution by the computer system.

In order to reduce the memory requirements for microprocessors, system designers and manufacturers are designing high-speed microprocessors for embedded applications with 16-bit instruction words rather than 32-bit instruction words. For example, the Hitachi-SH microprocessor is such a 16-bit instruction word microprocessor. With reduced instruction words, the offset value in indirect offset addressing is reduced, resulting in a reduced amount of contiguous memory addressable for a given instruction. Indirect offset (or indexed) addressing is an addressing mode incorporated in many microprocessor instruction sets.

In an indirect addressing mode instruction (for example, "mov.l@r4,r8"), the indirectly addressed register (r4) contains the address (effective address) within memory to be operated on. For example, if r4 contains 1024, then the instruction above would move the contents of memory address 1024 into register eight (r8). In an indirect offset (or indexed) addressing mode instruction, an offset value is first added to the contents of the indirectly addressed register to arrive at the effective address before the operation takes place. For example, for the instruction "mov.l@(8,r4),r8" (in which "@(8,r4)" is the indirect offset address reference), the offset value "8" is added to the value found in r4, resulting in the effective address. If r4 contains 1024, the effective address is 1032, and the contents of memory address 1032 is moved into r8.

Typically, indirect offset addressing is an efficient method for referencing fields within large data structures as the offset need only be manipulated to move through the fields. In 32-bit instruction word microprocessor systems, the offset field in the instruction word is usually adequate to access the entire range of addressable memory. However, in reduced instruction word systems, because of the reduced offset, the compiler must load a new value into the indirectly addressed register (r4) for the microprocessor to access the full range of addressable memory.

Typically, reduced instruction word compilers have overcome the problem of a reduced offset by the compiler generating address calculations for each indirect offset register reference during optimization. However, this approach reduces the efficiency of the reduced instruction word system. For example, a typical compiler would translate the out-of-range instruction "mov.l@(8,r4),r8" into three instructions: (1) "mov r4,r5", (2) "add #8,r5" and (3) "mov.l@r5,r8". The original instruction requires only one register access whereas the three resulting instructions now require three register accesses. Thus, a single instruction is replaced with three instructions, resulting in cumbersome and slow object code.

Thus, the foregoing problems present significant obstacles to effectively implementing an efficient method for using registers in compilers to generate good code.

SUMMARY OF THE INVENTION

The present invention provides a system and method for delaying indirect register offset resolution in a computer. Initially, a compiler creates an offset register linked list for each general-purpose register in a computer system. Alternatively, any suitable data structure, such as a queue, may be used. In the preferred embodiment, the compiler creates a null list for each general-purpose register. Alternatively, the offset register linked lists may be created when the compiler encounters a first line of compiler intermediate code containing an indirect register instruction.

Next, the compiler retrieves a block of compiler intermediate code from memory that was output from a prior phase of the compiler. Preferably, each block of compiler intermediate code represents a basic block of a high-level programming language program (for example, a loop body).

If the line of compiler intermediate code contains an indirect register instruction, then the compiler creates a linked list entry in the appropriate offset register linked list. The compiler stores the indirect-address offset value of the line of compiler intermediate code into an offset value and stores the address of the line of code into an instruction pointer. The compiler also stores the address of the current linked list entry into a list pointer of the previous linked list entry (the linked list entry created in the offset register linked list in the immediately prior pass through the method steps).

Next, the compiler scans the offset register linked list and extracts as a maximum indirect-address offset value and a minimum indirect-address offset value. The compiler then determines if the difference between the two values is greater than an indirect-address offset range. If the difference is less than the indirect-address offset range, the compiler reads the next line of compiler intermediate code and repeats the steps as described above.

However, if the difference is greater than the indirect-address offset range, the compiler outputs assembler code for the given offset-register linked list. The compiler first outputs an initial line of assembler code. The initial line of assembler code is the instruction "add #minimum indirect-address offset value, rx" in which rx is the general-purpose register of the current offset register linked list (the offset register linked list being traversed).

Next, the compiler retrieves the next linked list entry from the current offset register linked list and determines if the linked list entry retrieved is the out-of-range entry (that is, if the offset value of the retrieved linked list entry causes the difference between the maximum and minimum indirect-address offset values to exceed the indirect-address offset range), or if there are no more linked list entries in the offset register linked list. If the current offset value is not the out-of-range entry, then, the compiler resolves the offset value by subtracting the minimum indirect-address offset value for the offset register linked list from the offset value. The compiler uses the resolved offset value to output the line of assembler code and removes the current linked list entry from the offset register linked list.

If the compiler determines that the current linked list entry is the out-of-range entry or that no more linked list entries remain in the offset register linked list, then the compiler outputs a final line of assembler code. This final line of assembler code is the instruction "add #−minimum indirect-address offset value, rx" which is a reversal of the initial line of assembler code. Thus, the final line of assembler code resets rx to its initial value. The compiler then retrieves the next line of compiler intermediate code and repeats the steps as described above.

If the retrieved line of compiler intermediate code contains a label, then, before saving the information for the intermediate code as described above, the compiler determines if any non-empty offset register linked lists exist. If the compiler determines that a non-empty offset register linked list exists, then the compiler retrieves the offset register linked list and outputs the assembler code for the list as discussed above for each non-empty offset register linked list.

Once the compiler has reached the end of the block of compiler intermediate code, the compiler traverses through any non-empty offset register linked lists and outputs the assembler code as described above.

Thus, the invention provides an efficient and effective system and method for using registers in compilers to generate accurate, efficient, and fast code.

BRIEF DESCRIPTION OF THE DRAWINGS

FIG. 6a is a listing of the compiler intermediate code of FIG. 2 before the application of the preferred method steps of FIGS. 4a through 4d;

FIG. 6b is a listing of the assembler code of FIG. 2 after application of the preferred method steps of FIGS. 4a through 4d;

FIG. 6c is a listing of the assembler code of FIG. 2 without application of the preferred method steps of the present invention;

FIG. 7 is a memory map of the addressable memory of FIG. 5 for the example of FIG. 6a.

DETAILED DESCRIPTION OF THE PREFERRED EMBODIMENT

The present invention provides a system and method for a data processing system to delay indirect register offset resolution during program code compilation. The invention generally includes a processor having a plurality of registers, a memory storing program instructions, and a compiler for translating the program instructions into executable object code for execution by the processor.

Figure 1:
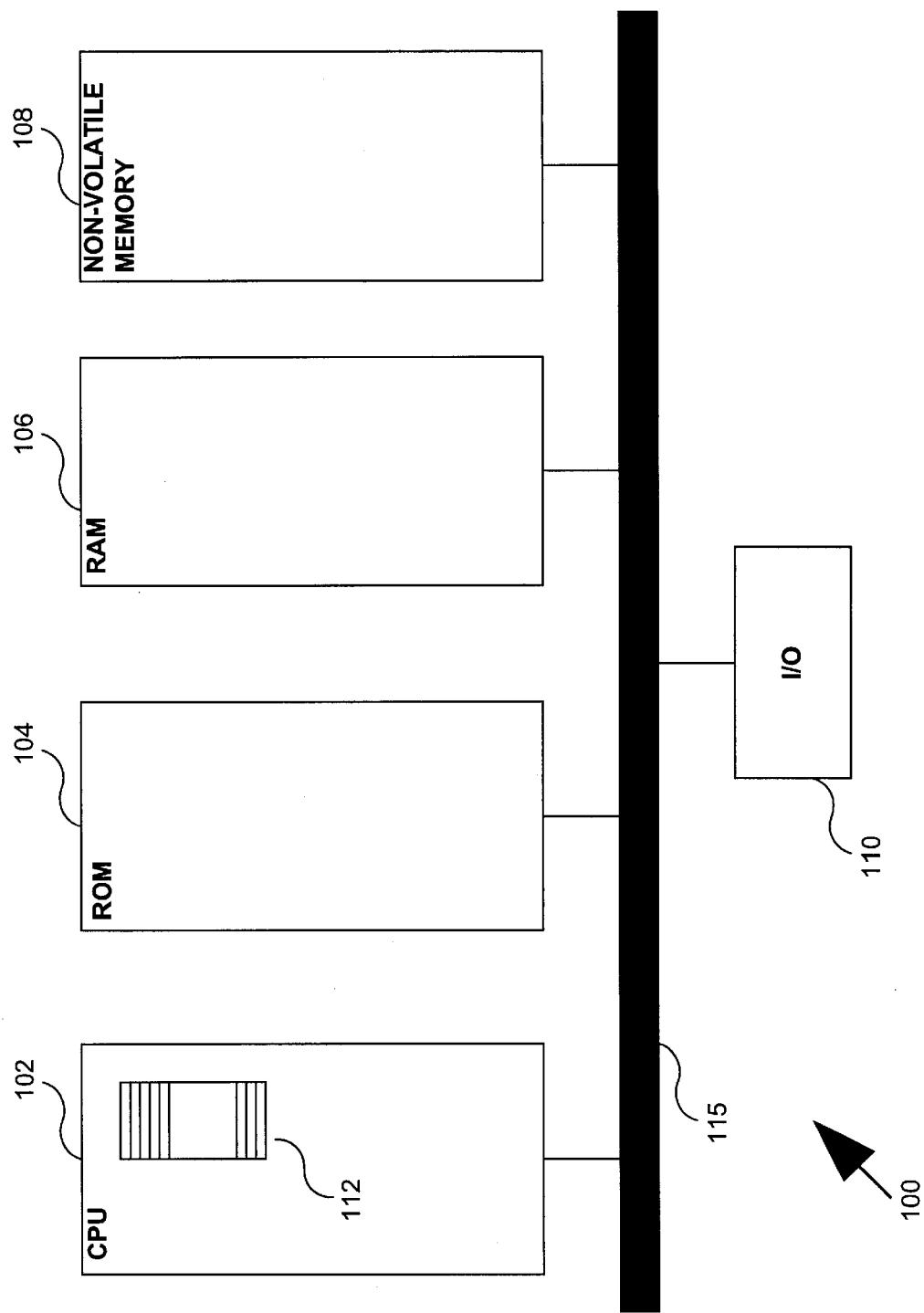
FIG. 1 is a block diagram showing the architecture of a preferred computer system, according to the present invention.

FIG. 1 is a block diagram showing the architecture of a preferred computer system 100, according to the present invention. The computer system 100 consists of a central processing unit (CPU) 102, read-only memory (ROM) 104, random-access memory (RAM) 106, non-volatile memory 108, and input and output (I/O) 110, all of which are connected via bus 115.

CPU 102 contains a bank of general-purpose registers 112. General-purpose registers 112 are used by programs contained within computer system 100 for the temporary storage of data during computer system 100 operation. In the preferred embodiment, computer system 100 uses general-purpose registers 112 during execution of programs contained within RAM 106 to access areas of computer system 100 memory. Thus, general-purpose registers 112 contain the addresses of memory locations within computer system 100.

Figure 2:
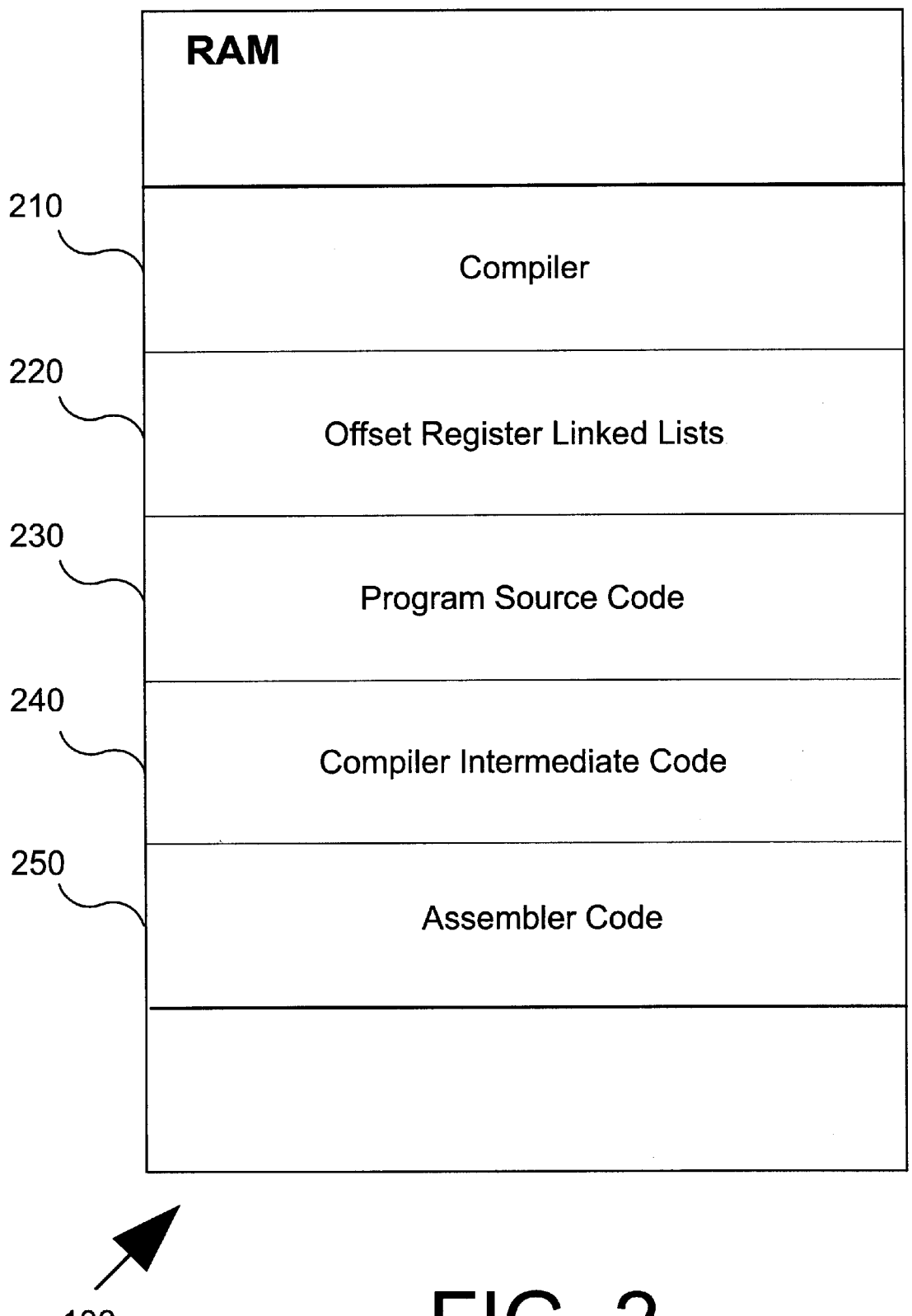
FIG. 2 is a memory map representation for the random-access memory of FIG. 1.

FIG. 2 is a memory map representation for random-access memory (RAM) 106 of FIG. 1. In the FIG. 2 embodiment, RAM 106 includes compiler 210, offset register linked lists 220, program source code 230, compiler intermediate code 240, and assembler code 250. Program source code 230 includes program instructions written in a high-level programming language such as C++. Compiler intermediate code 240 includes intermediate output from compiler 210. In the preferred embodiment, compiler 210 creates compiler intermediate code 240 as a first pass before optimization of the compiler 210 output into assembler code 250 using the preferred method steps of the present invention.

Compiler 210 includes a series of instructions that CPU 102 executes to advantageously convert program source code 230 into assembler code 250. In the preferred embodiment, CPU 102 loads compiler 210 from non-volatile memory 108 into RAM 106. CPU 102 then executes the instructions contained within compiler 210 to translate program source code 230 into assembler code 250.

Compiler 210 loads program source code 230 from non-volatile memory 108 into RAM 106. Compiler 210 first translates program source code 230 into compiler intermediate code 240 and then optimizes compiler intermediate code 240 to generate assembler code 250. Compiler 210 further translates assembler code 250 into object code, which is suitable for execution by computer system 100.

During the optimization of compiler intermediate code 240 into assembler code 250, compiler 210 stores general-purpose register 112 information (contained in compiler intermediate code 240) into offset register linked lists 220. Information for each register 112 used during compiler intermediate code 240 generation is stored in a separate offset register linked list 220.

Figure 3:
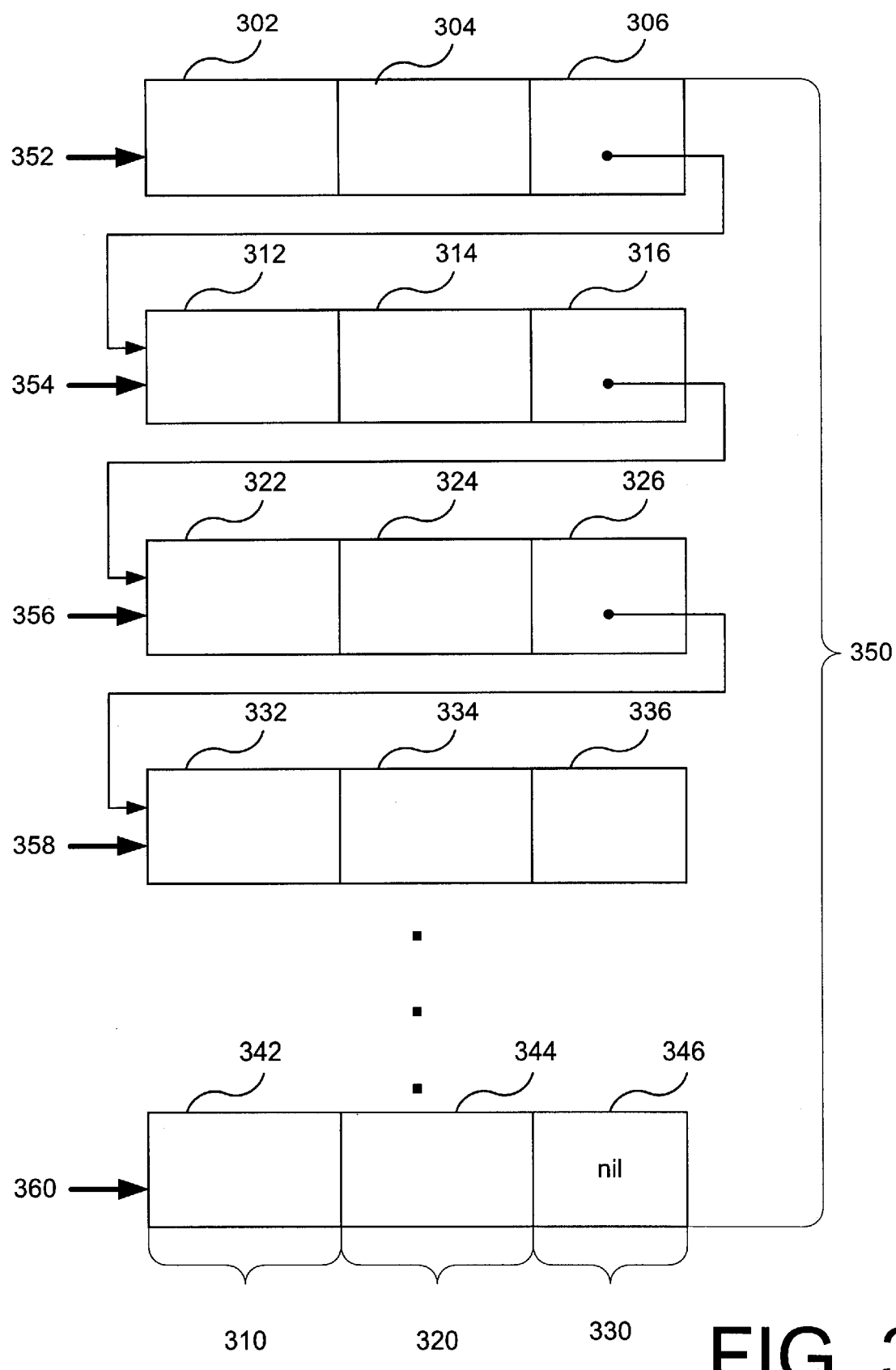
FIG. 3 is a block diagram representation for an offset register linked list of FIG. 2, according to the present invention.

FIG. 3 is a block diagram representation for an offset register linked list 220 of FIG. 2, according to the present invention. In the FIG. 3 embodiment, each offset register linked list 220 includes linked list entries 350. In the preferred embodiment, each offset register linked list 220 contains list entry 1 (352) through list entry n (360). Each linked list entry 350 includes offset value 310, instruction pointer 320, and list pointer 330. Preferably, each offset register linked list 220 contains offset value 1 (302) through offset value n (342), instruction pointer 1 (304) through instruction pointer n (344), and list pointer 1 (306) through list pointer n (346).

Offset register linked lists 220 are dynamically allocated during compiler 210 execution. Each offset register linked list 220 is "nil" or empty at the start of compiler 210 execution. When compiler 210 reads a line of compiler intermediate code 240 that contains an indirect register instruction, compiler 210 creates an offset register linked list 220 comprising a linked list entry 350 for the specified register. Upon creation of offset register linked list 220, compiler 210 stores the indirect-address offset value of a given line of compiler intermediate code 240 into offset value 310. In addition, compiler 210 stores the address of the line of compiler intermediate code 240 into instruction pointer 320. When the first linked list entry 350 is created, the list pointer 330 is "nil" (i.e., list pointer 330 points to nothing). When a second linked list entry 350 is created for the same offset register linked list 220, list pointer 330 of the first linked list entry 350 points to the second linked list entry 350 and list pointer 330 of the second linked list entry 350 is "nil."

Figure 4A:
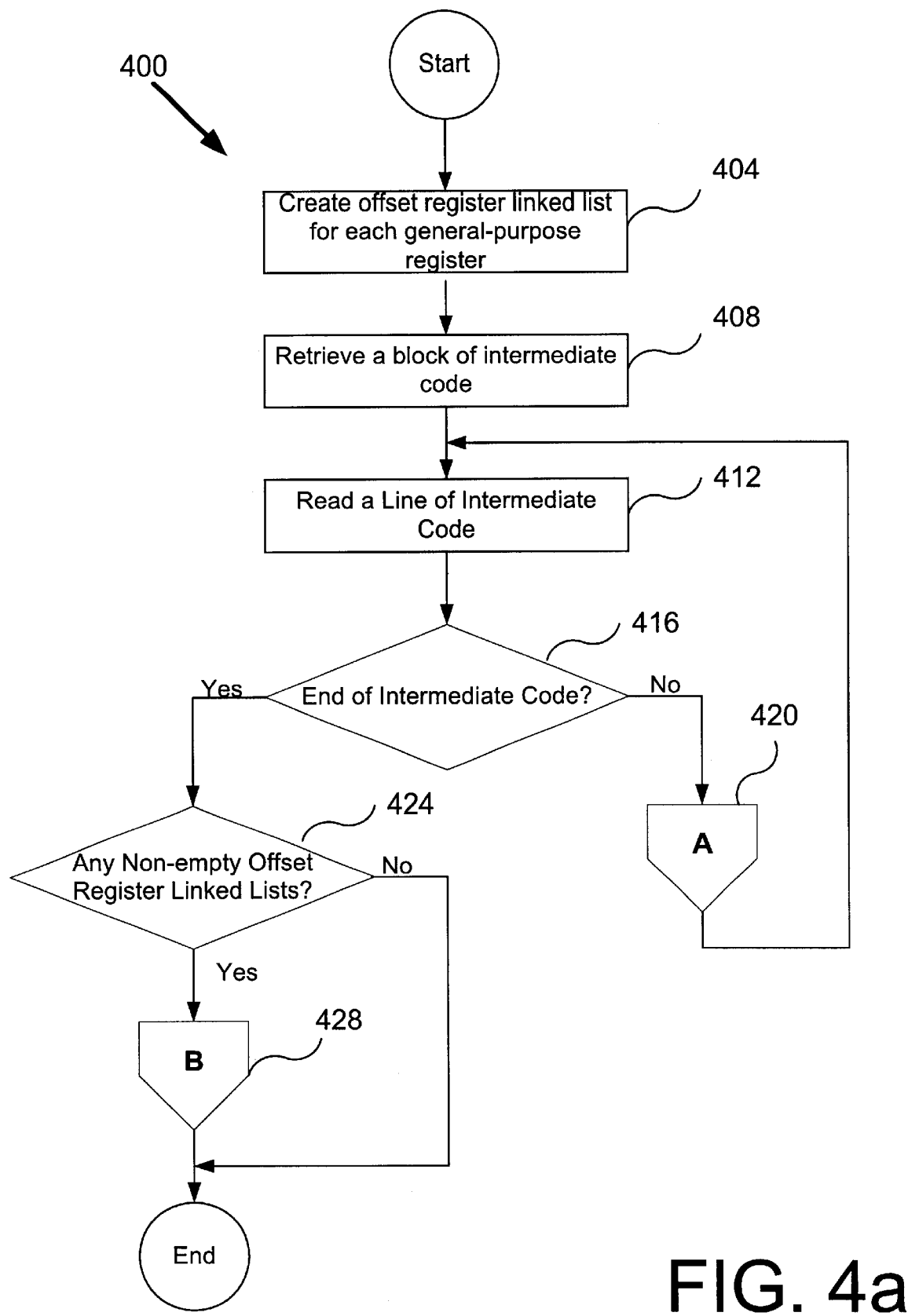
FIGS. 4a through 4d are flowcharts of the preferred method steps for delaying indirect offset register resolution, according to the present invention.

FIGS. 4a through 4d are flowcharts of the preferred method steps for delaying indirect offset register resolution, according to the present invention. FIG. 4a is a flowchart of steps in a method 400 for traversing compiler intermediate code 240. Initially, in step 404, compiler 210 creates an offset register linked list 220 for each general-purpose register 112 in computer system 100. In the preferred embodiment, compiler 210 creates a null list for each general-purpose register 112. Alternatively, offset register linked lists 220 may be created when the compiler encounters a first line of compiler intermediate code 240 containing an indirect register instruction.

Next, in step 408, compiler 210 retrieves a block of compiler intermediate code 240. Preferably, each block of compiler intermediate code 240 represents a basic block of a high-level programming language program (for example, a loop body).

Next, at step 412, compiler 210 reads a line of compiler intermediate code 240. In step 416, compiler 210 determines if the end of a block of compiler intermediate code 240 has been reached. If the block of compiler intermediate code 240 is not at an end, compiler 210 executes step 420, which is described in detail in reference to FIG. 4b, and then compiler 210 returns to step 412 to continue execution of method 400.

However, if at step 416, compiler 210 determines that it has traversed to the end of compiler intermediate code 240, then compiler 210, at step 424, determines if any offset register linked lists 220 are non-empty. If compiler 210 determines that all offset register linked lists 220 are empty, then compiler 210 ends execution of method 400. However, if compiler 210 determines that any offset register linked list 220 is non-empty, then compiler 210 executes step 428, which is described below in reference to FIG. 4c, and then ends execution of method 400.

Figure 4B:
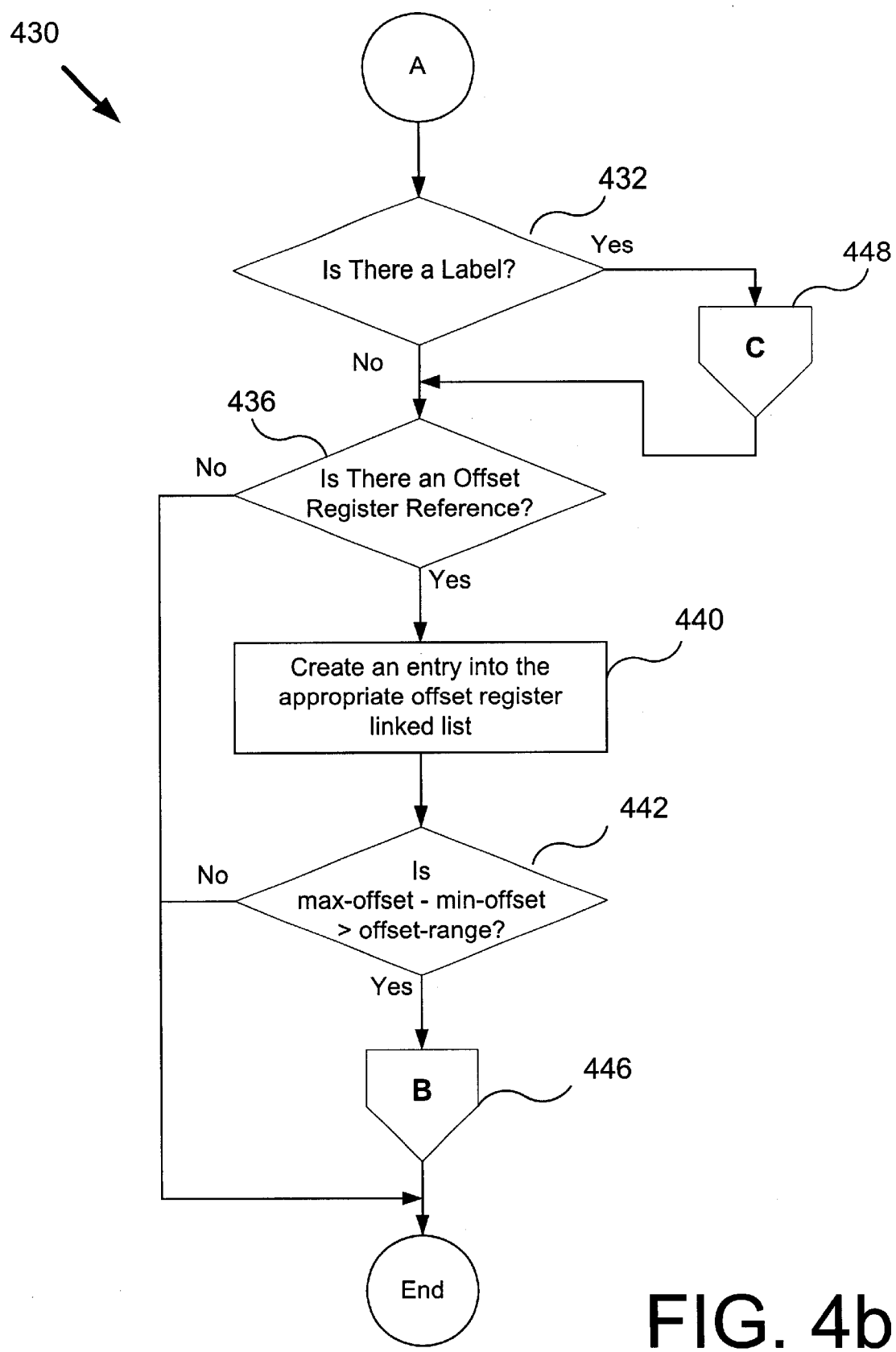

FIG. 4b is a flowchart of further steps in a method 430 for traversing compiler intermediate code 240. Method 430 corresponds to step 420 of FIG. 4a. Initially, in step 432, compiler 210 determines if the line of compiler intermediate code 240 contains a label. If the line of compiler intermediate code 240 contains a label, then compiler 210 executes step 448, which is described in reference to FIG. 4d, and ends execution of method 430.

A label found in compiler intermediate code 240 corresponds to an entry point into the code, such as a decision point within a flowchart or a point that CPU 102 jumps to while executing the object code. When compiler 210 encounters a label in compiler intermediate code 240, compiler 210 cannot determine from what location the program is jumping. Therefore, compiler 210 must restore all register 112 pointers back to their initial state before compiler 210 began execution of method 400. By restoring the general-purpose registers 112, other blocks of code may rely on the general-purpose registers 112 during execution.

Referring again to step 432, if the line of compiler intermediate code 240 does not contain a label, then compiler 210, at step 436, determines if the line of compiler intermediate code 240 contains an indirect register instruction. If the line of compiler intermediate code 240 does not contain an indirect register instruction, then compiler 210 ends execution of method 430 and returns to step 412 of FIG. 4a.

If, at step 436, compiler 210 determines that the line of compiler intermediate code 240 contains an indirect register instruction, then, at step 440, compiler 210 creates linked list entry 350 in the appropriate offset register linked list 220. Compiler 210 stores the indirect-address offset value of the line of compiler intermediate code 240 into offset value 310 and stores the address of the line of code into instruction pointer 320. Compiler 210 also stores the address of the current linked list entry 350 into list pointer 330 of the previous linked list entry 350 (which is the linked list entry 350 created in the offset register linked list 220 in the immediately prior pass through method 430).

Next, at step 442, compiler 210 determines the difference between the maximum indirect-address offset value in offset register linked list 220 and the minimum indirect-address offset value in offset register linked list 220. In the preferred embodiment, compiler 210 scans offset values 310 for each linked list entry 350 in the current offset register linked list 220. Compiler 210 extracts the largest offset value 310 in the offset register linked list 220 as the maximum indirect-address offset value and extracts the smallest offset value 310 in the offset register linked list 220 as the minimum indirect-address offset value. Alternatively, compiler 210 may maintain the maximum and minimum indirect-address offset values while creating each linked list entry 350 in step 440 by comparing the current offset value 310 with stored maximum and minimum values.

Compiler 210 then determines if the difference is greater than the indirect-address offset range. If the difference is not greater than the indirect-address offset range, then compiler 210 ends execution of method 430 and returns to step 412 of FIG. 4a. However, if the difference is greater than the indirect-address offset range, compiler 210 executes step 446 (described below in reference to FIG. 4c), ends execution of method 430, and returns to step 412 of FIG. 4a.

Each register 112 is capable of accessing a given range of memory within computer system 100 by the indirect addressing method, in which the indirect-address offset value is added to the value contained in register 112. The resultant address is accessed by CPU 102 during execution of the program object code. The indirect-address offset value comprises a certain number of bits within an instruction word. In the preferred embodiment, the indirect-address offset value is four bits in size and is scaled by a multiple of four. (Thus, the indirect-address offset values have a maximum range of 60 (($2^4$−1)*4).) The indirect-address offset value is scaled because CPU 102 preferably accesses data at every fourth long word address location within computer system 100 memory. The indirect-address offset range corresponds to the set of values that an indirect-address offset value may be for the given bit size. Thus, in the preferred embodiment, the indirect-address offset range has a value of 60.

Figure 4C:
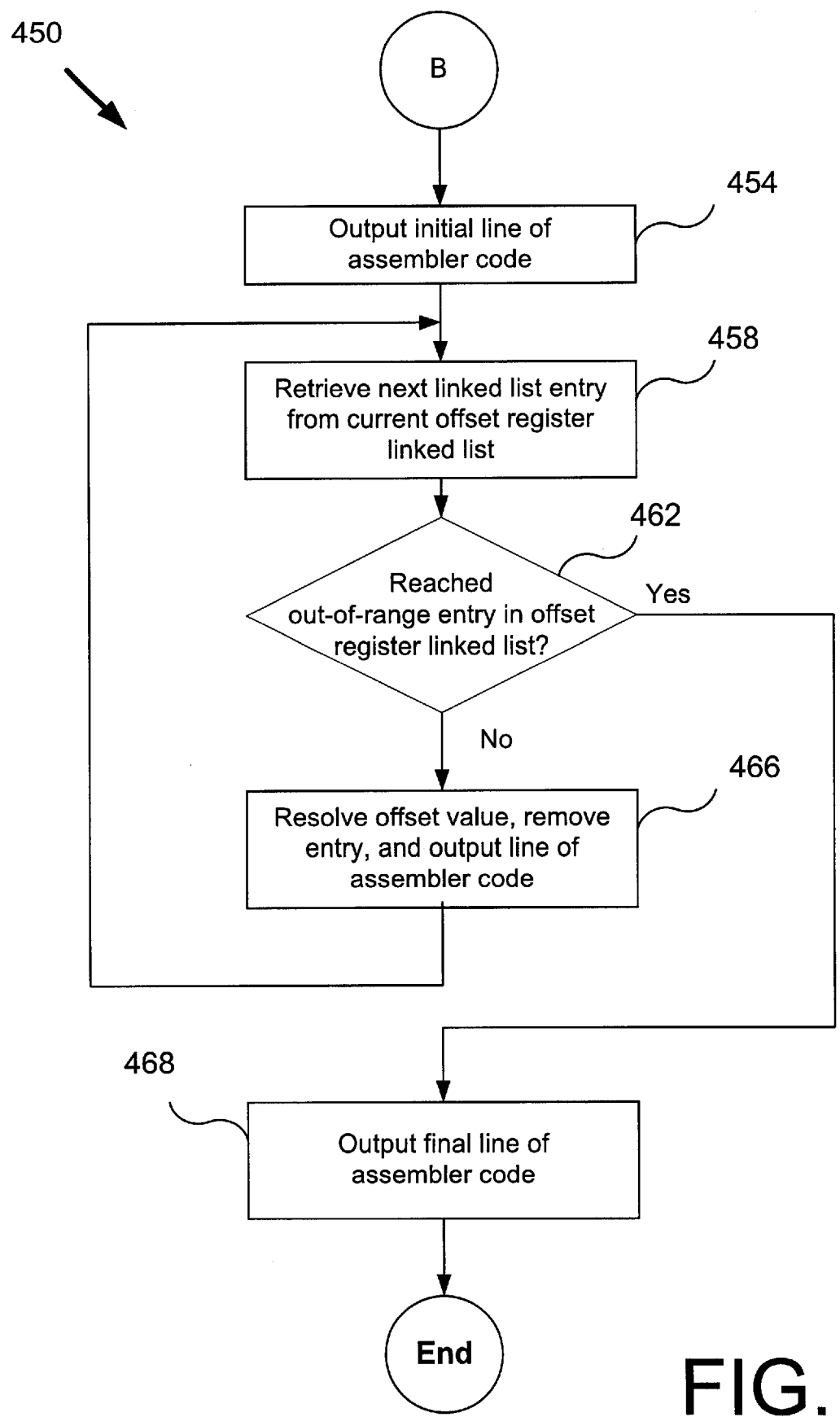

FIG. 4c is a flowchart of further steps in a method 450 for traversing compiler intermediate code 240. Method 450 corresponds to step 428 of FIG. 4a, step 446 of FIG. 4b, and step 486 of FIG. 4d. Initially, in step 454, compiler 210 outputs an initial line of assembler code 250. The initial line of assembler code 250 is the instruction "add #minimum indirect-address offset value, rx" in which rx is the general-purpose register 112 of the current offset register linked list 220 (the offset register linked list 220 being traversed by method 450). This instruction, when executed as object code, adds the minimum indirect-address offset value found within the current offset register linked list 220 to the current general-purpose register 112 (rx).

Next, in step 458, compiler 210 retrieves the next linked list entry 350 from the current offset register linked list 220. Then, in step 462, compiler 210 determines if the linked list entry 350 retrieved is the out-of-range entry (that is, if offset value 310 of the linked list entry 350 causes the difference between the maximum and minimum indirect-address offset values to exceed the indirect-address offset range, as described in reference to step 442 of FIG. 4b), or if there are no more linked list entries 350 in the offset register linked list 220. If the current offset value 310 is not out-of-range, then, in step 466, compiler 210 resolves offset value 310 by subtracting the minimum indirect-address offset value for offset register linked list 220 from offset value 310. For example, if the minimum indirect-address offset value is 76 and offset value 310 is 84, then offset value 310 would be resolved to 8 (84-76).

Compiler 210 then removes the current linked list entry 350 from offset register linked list 220 and outputs the line of assembler code 250 for the current indirect register instruction. For example, if the original compiler intermediate code 240 instruction was "mov.l@(84,r3),r8" then using the resolved offset value of 8 from the example above, compiler 210 would create a line of assembler code 250 of "mov.l@(8,r4),r8." Compiler 210 then returns to step 458.

If, at step 462, compiler 210 determines that the linked list entry 350 is out-of-range or that no more linked list entries 350 remain in offset register linked list 220, then, at step 468, compiler 210 outputs a final line of assembler code 250. The final line of assembler code 250 is the instruction "add #-minimum indirect-address offset value, rx" which is a reversal of the instruction that was output in step 454. This final line of assembler code 250 resets the general-purpose register 112. Compiler 210 then ends execution of method 450.

During a subsequent compiler 210 optimization phase, the final line of assembler code 250 will be resolved with immediately following first line of assembler code 250 for a subsequent pass through method 450.

Figure 4D:
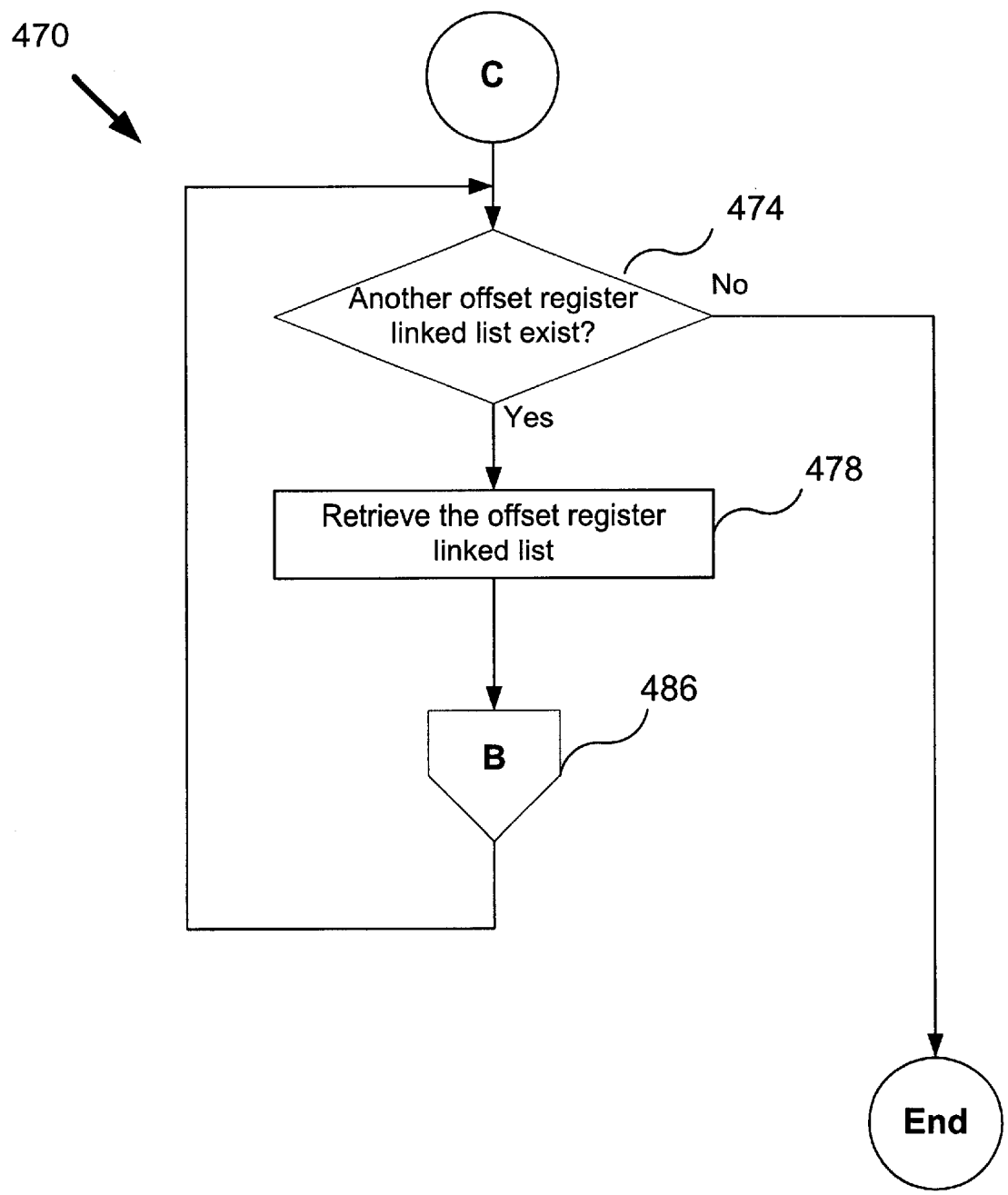

FIG. 4d is a flowchart of steps in a method 470 for traversing compiler intermediate code 240. Method 470 corresponds to step 448 of FIG. 4b. Initially, in step 474, compiler 210 determines if a non-empty offset register linked list 220 exists. If compiler 210 determines that a non-empty offset register linked list 220 does exist, then, in step 478, compiler 210 retrieves offset register linked list 220. Next, compiler 210 executes step 486, which is described in reference to FIG. 4c, and returns to step 474.

Referring again to step 474, if compiler 210 determines that only empty offset register linked lists 220 exist, then compiler 210 ends execution of method 470 and returns to FIG. 4b to continue execution.

Figure 5:
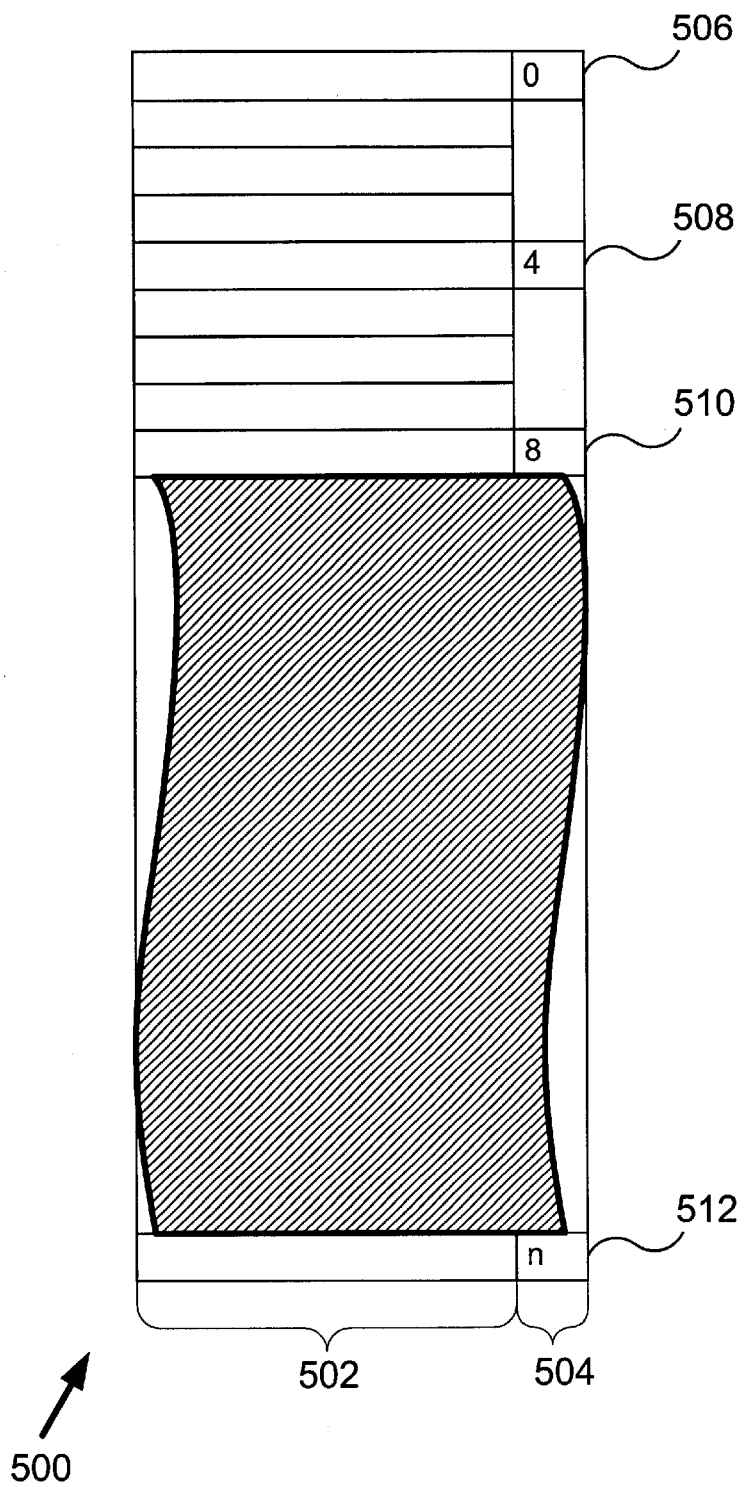
FIG. 5 is a memory map representation of addressable memory, according to the present invention.

FIG. 5 is a memory map representation of addressable memory 500, according to the present invention. Addressable memory 500 may reside anywhere in computer system 100 memory such as ROM 104, RAM 106, or non-volatile memory 108. Addressable memory 500 consists of a continuous block of memory and includes location data 502 and memory address 504. Memory address 504 is not a physical part of addressable memory 500, but rather is the location within memory where location data 502 is stored. In the preferred embodiment, addressable memory 500 is addressable at every fourth long word memory location. Thus, in the FIG. 5 embodiment, location data 502 is addressable at memory address 0 (506), memory address 4 (508), memory address 8 (510), through memory address n (512), where n is a multiple of four.

FIG. 6a is a listing of compiler intermediate code 240 of FIG. 2 before the application of the preferred method steps of FIGS. 4a through 4d. The FIG. 6a listing includes a block of compiler intermediate code 240 from line one through line five. All five lines contain indirect register instructions for register four (r4). Line one includes a label "Func:" and the indirect register instruction "mov.l@(84,r4),r8." When executed, this instruction would move location data 502 at the memory address 504 pointed to by r4 plus indirect-address offset value of 84 into register eight (r8). Thus, if r4 contained the value 100, the line one instruction would move location data 502 at memory address 504 of 184 into r8. Similarly, the indirect register instructions of line two through line five move location data 502 at memory address 504 pointed to by r4 plus an indirect-address offset value into a general-purpose register 112.

FIG. 6b is a listing of assembler code 250 of FIG. 2 after application of the preferred method steps of FIGS. 4a through 4d for the listing of compiler intermediate code 240 of FIG. 6a. In the FIG. 6b listing, lines one through five represent the assembler code 250 for lines one through three of FIG. 6a. Line one includes the label "Func:" from line one of FIG. 6a (FIG. 4d) and includes the initial line of assembler code 250 (step 454 FIG. 4c). Lines two through four of FIG. 6b are the lines of assembler code 250 generated for lines one through three of FIG. 6a. Line five of FIG. 6b represents the final line of assembler code 250 (step 468 FIG. 4c) for the indirect register instructions of lines one through three of FIG. 6a.

Similarly, lines six through nine of FIG. 6b include assembler code 250 generated by method 450 (FIG. 4c) for lines four and five of FIG. 6a. The method of generating assembler code 250 of FIG. 6b from compiler intermediate code 240 of FIG. 6a is described in detail in reference to FIGS. 8a and 8b.

FIG. 6c is a listing of assembler code 250 of FIG. 2 generated using conventional optimization methods (i.e., assembler code not generated with the preferred method steps of the present invention). During the optimization of compiler intermediate code 240 of FIG. 6a into assembler code 250 of FIG. 6c, a compiler removes all indirect register instructions. Thus, line one of FIG. 6a is optimized into lines one and two of FIG. 6c. The compiler creates the instruction to add the indirect-address offset value to the contents of register four (r4). Then, in line two of FIG. 6c, the compiler creates the instruction to move the contents of r4 into r8. Similarly, the compiler optimizes line two of FIG. 6a into lines three and four of FIG. 6c, optimizes line three of FIG. 6a into lines five and six of FIG. 6c, optimizes line four of FIG. 6a into lines seven and eight of FIG. 6c, and optimizes line five of FIG. 6a into lines nine and ten of FIG. 6c.

Figure 7:
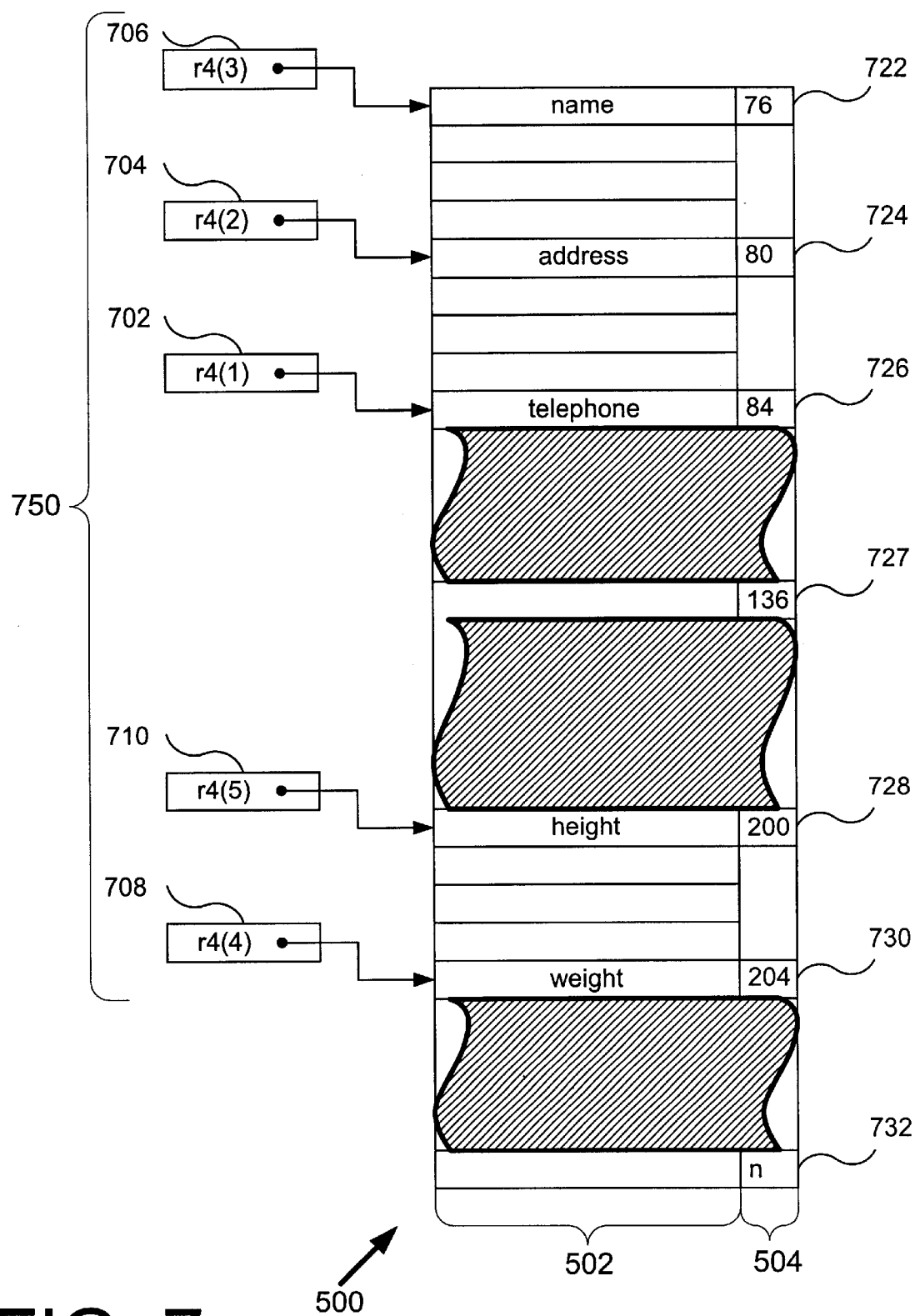

FIG. 7 is a memory map of addressable memory 500 of FIG. 5 for the example of FIG. 6a. The FIG. 7 memory may include register pointers 750 that point to the address in addressable memory 500 in indirect addressing mode. In this mode, the actual address is found by adding the value in a register (base address) to the indirect-address offset value of the indirect register instruction. Register pointers 750 include pointer r4(1) (702) through pointer r4(5) (710). Each register pointer 750 corresponds to an indirect register instruction of a line of FIG. 6a. Register r4(1) (702) corresponds to the indirect register instruction of line one of FIG. 6a, register r4(2) (704) corresponds to the indirect register instruction of line two of FIG. 6a, etc. For convenience, memory addresses 504 only show the offset values 310 from the indirect register instructions of FIG. 6a and include memory address 1 (722) through memory address n (732). (The actual memory address 504 would be found by adding the base address to the indirect-address offset value shown.)

In the preferred embodiment, CPU 102 may indirectly access addressable memory 500 less than or equal to the indirect-address offset range (60) without resetting general-purpose register 112 base addresses. Thus, CPU 102 may load the memory address 504 of memory address 4 (727) into r4 as the base address and access memory address 1 (722) through memory address 3 (726) without resetting the r4 base address. However, to access addressable memory 500 outside the indirect-address offset range, such as memory address 5 (728) or memory address 6 (730), the r4 base address must be reset.

One purpose of compiler code optimization is to minimize the resetting of base addresses while guaranteeing the integrity of the general-purpose registers 112 after CPU 102 executes a block of object code. The typical approach to code optimization has been to generate assembler code 250 as shown in FIG. 6c. Such code is easy to generate but slow to execute. However, the present invention minimizes the amount of base register resetting while maintaining general-purpose register 112 integrity by delaying the offset value 310 resolution until the indirect-address offset value of a given instruction is outside the indirect-address offset range.

Figure 8A:
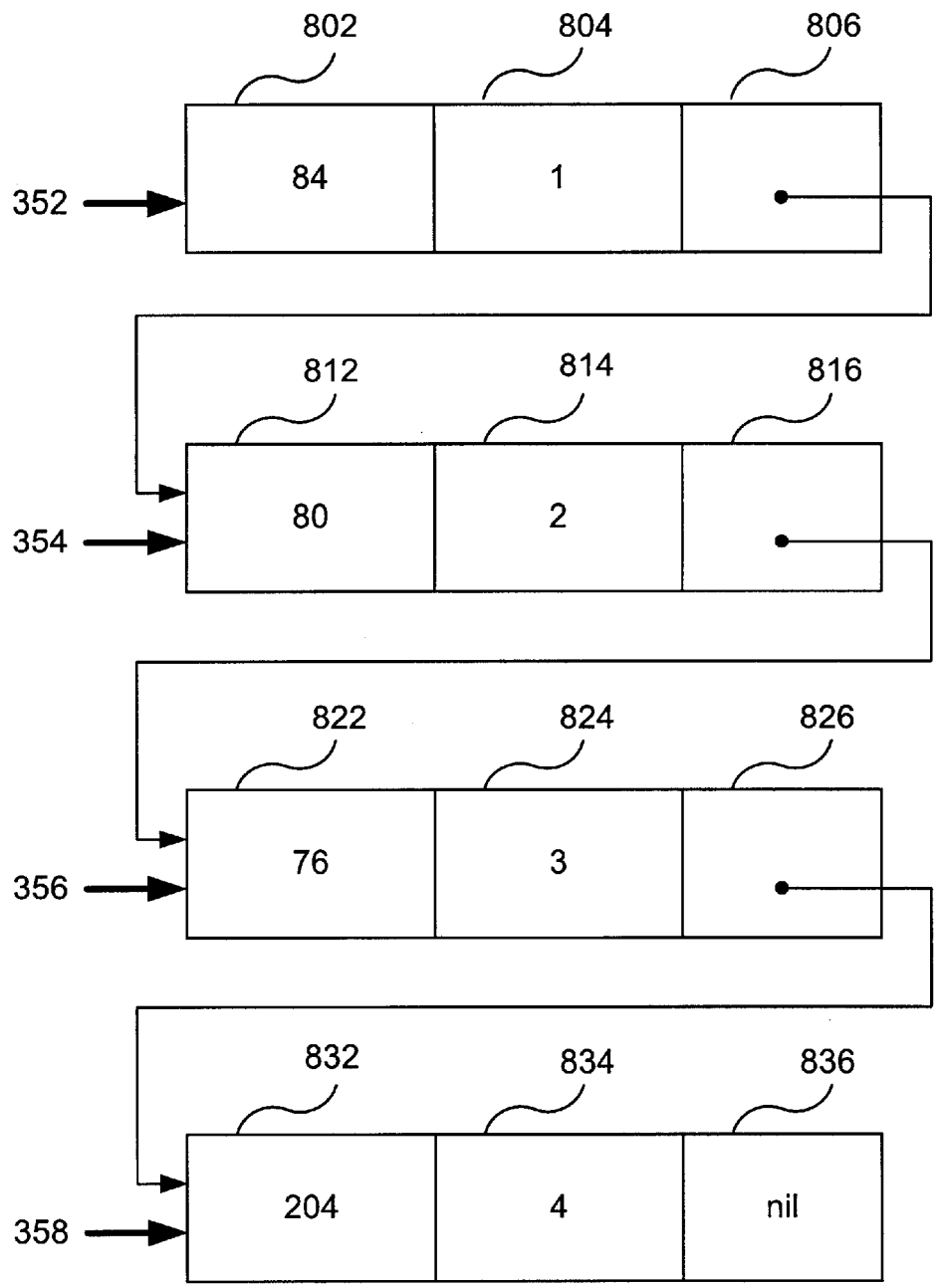
FIGS. 8a and 8b are block diagram illustrations of the offset register linked list of FIG. 3 for the example of FIG. 6b, according to the present invention.
Figure 8B:
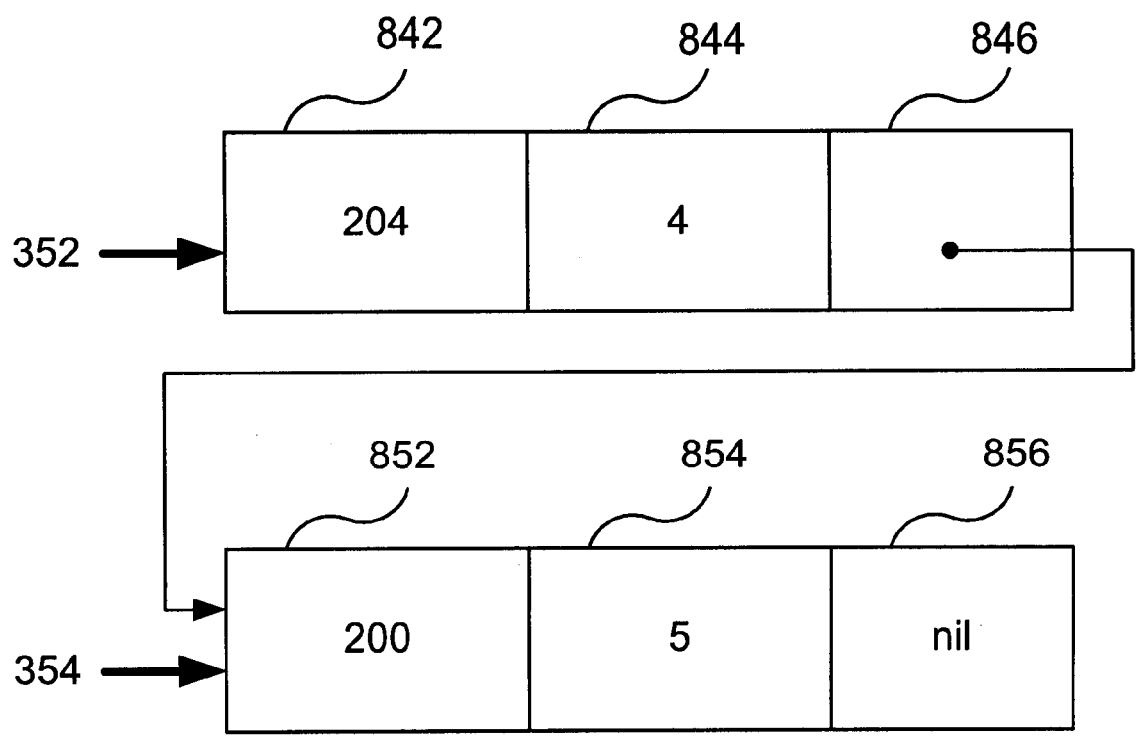

FIGS. 8a and 8b are block diagram illustrations of offset register linked list 220 of FIG. 3 for the example of FIG. 6a, according to the present invention. The FIG. 8a illustration includes linked list entries 350 created by compiler 210, according to the preferred method steps of FIGS. 4a through 4d, for lines one through four of FIG. 6a. The FIG. 8a illustration represents offset register linked list 220 for general-purpose register 112 four (r4) after compiler 210 processes lines one through four of FIG. 6a. FIG. 8b illustrates the r4 offset register linked list 220 after compiler 210 outputs lines one through five of FIG. 6b and after compiler 210 processes line five of FIG. 6a. The example follows the method steps of FIGS. 4a through 4d.

Corresponding to step 404 of FIG. 4a, compiler 210 creates offset register linked lists 220 for each general-purpose register 112 in computer system 100. Because FIG. 6a indirect register instructions reference only r4, FIG. 8a illustrates only the r4 offset register linked list 220. Compiler 210 retrieves lines one through five of FIG. 6a as the block of compiler intermediate code 240 (step 408 FIG. 4a). Compiler 210 then reads line one of FIG. 6a, determining if it has read past the last line in the block of code (steps 412 through 416 of FIG. 4a).

Because compiler 210 has not read past the last line, compiler 210 executes method 430 (FIG. 4b). Line one of FIG. 6a contains the label "Func:" (step 432 FIG. 4b), therefore, compiler 210 executes method 470 (FIG. 4d) to output all assembler code 250 instructions from any non-empty offset register linked list 220. If the FIG. 6a block of code is contained within a larger section of compiler intermediate code 240, all general-purpose registers 112 would need to be reset. Referring again to FIG. 4b, compiler 210 determines if line one of FIG. 6a contains an indirect register instruction (step 436). Line one contains the indirect register instruction "@(84,r4)", thus, compiler 210 executes step 440 of FIG. 4b.

Line one has an indirect-address offset value of 84, which compiler 210 stores in offset value 1 (802) of FIG. 8a. Compiler 210 stores the address in memory of line one into instruction pointer 1 (804) (in the example, the line number from FIG. 6a is used as this address). List pointer 1 (806) would initially point to "nil."

Compiler 210 scans the FIG. 8a offset register linked list 220, determining the maximum indirect-address offset value (84) and minimum indirect-address offset values (84) (step 442 FIG. 4b). The difference between the maximum and minimum values (0) is less than the indirect-address offset range (60) of the preferred embodiment. Therefore, compiler 210 retrieves line two of FIG. 6a (step 412 FIG. 4a), which contains the indirect-address instruction "@(80,r4)." Compiler 210 creates list entry 2 (354) of FIG. 8a (step 440 FIG. 4b). Compiler 210 stores the indirect-address offset value of 80 into offset value 2 (812), stores the address in memory of line two into instruction pointer 2 (814), and stores the address of list entry 2 (352) into list pointer 1 (806) (shown as an arrow from list pointer 1 (806) to list entry 2 (354)).

Compiler 210 then scans the FIG. 8a offset register linked list 220, determining the maximum indirect-address offset value (84) and the minimum indirect-address offset value (80) (step 442 FIG. 4b). The difference between the maximum and minimum values (4) is less than the indirect-address offset range (60) of the preferred embodiment. Therefore, compiler 210 retrieves line three of FIG. 6a (step 412 FIG. 4a). Compiler 210 repeats steps 436 through 442 for lines three and four of FIG. 6a, storing the corresponding values into the FIG. 8a offset register linked list 220. From line 3 of FIG. 6a, compiler 210 stores the indirect-address offset value of 76 into offset value three (822), stores the address in memory of line three into instruction pointer 3 (824), and stores the address in memory of list entry 3 (356) into list pointer 2 (816). From line 4 of FIG. 6a, compiler 210 stores the indirect-address offset value of 204 into offset value four (832), stores the address in memory of line three into instruction pointer 4 (834), and stores the address in memory of list entry 4 (358) into list pointer 3 (826).

After storing the values into list entry 4 (358), compiler 210 scans the FIG. 8a offset register linked list 220, determining the maximum indirect-address offset value (204) and the minimum indirect-address offset value (76) (step 442 FIG. 4b). The difference between the two values (128) is greater than the indirect-address offset range (60). Therefore, compiler 210 executes method 450 (FIG. 4c).

Referring to FIG. 4c, compiler 210 outputs the initial line of assembler code 250 (step 454), which is shown as line one of FIG. 6b. Compiler 210 retrieves list entry 1 (352) from the FIG. 8a offset register linked list (step 458). List entry 1 (352) is not the out-of-range entry (list entry 4 (358)), therefore, compiler 210 resolves the offset value, removes list entry 1 (352), and outputs the resolved assembler code 250, which is shown as line 2 of FIG. 6b. (The resolved offset value is offset value 310 minus the minimum indirect-address offset value.) For list entry 1 (352), the resolved offset value is 8. Similarly, compiler 210 executes steps 458 through 466 for list entry 2 (354), resulting in line three of FIG. 6b, and again for list entry 3 (356), resulting in line four of FIG. 6b.

When compiler 210 retrieves list entry 4 (358), compiler 210 determines that this linked list entry 350 is the out-of-range entry (step 462 FIG. 4c). Compiler 210, therefore, outputs the final line of assembler code 250, which is shown as line five of FIG. 6b.

Compiler 210 then retrieves line five of FIG. 6a (step 412 of FIG. 4a). Executing steps 436 through 440 of FIG. 4b, compiler 210 adds list entry 2 (354) of FIG. 8b for line five of FIG. 6a. (List entry 1 (352) of FIG. 8b represents the previously saved values for line four of FIG. 6a.)

Compiler 210 then returns to step 412 of FIG. 4a. In the FIG. 6a example, compiler 210 has reached the end of compiler intermediate code 240 (step 416 FIG. 4a). Thus, compiler 210 determines if any offset register linked list 220 is non-empty (step 424 FIG. 4a). The r4 offset register linked list 220 still contains linked list entries 350 (FIG. 8b), therefore, compiler 210 executes method 450 (FIG. 4c) to output assembler code 250 for the remaining linked list entries 350 of FIG. 8b.

Compiler 210 outputs an initial line of assembler code 250 that is shown as line six of FIG. 6b. In the FIG. 8b illustration, the minimum indirect-address offset value is 200 (offset value 2 (852)). Compiler 210 then traverses offset linked list 220 of FIG. 8b to output lines seven and eight of FIG. 6b (steps 458 through 466 of FIG. 4c). After outputting line eight of FIG. 6b, compiler 210 determines that it has reached the end of the r4 offset register linked list 220 (step 462) and, therefore, outputs the final line of assembler code 250, which is shown as line nine in FIG. 6b (step 468 FIG. 4c). Compiler 210 then ends execution of the FIGS. 4a through 4d method steps for the FIG. 6a example.

During a subsequent optimization of assembler code 250 of FIG. 6b, compiler 210 may combine lines five and six of FIG. 6b to generate a new instruction. This new instruction would read "add #128,r4."

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment.

Therefore, these and other variations upon the preferred embodiments are intended to be covered by the present invention, which is limited only by the appended claims.

What is claimed is:

1. A method for delaying register offset resolution, comprising the steps of:

examining a program instruction;

generating an entry in an offset register list, the entry including an indirect-address offset value corresponding to the examined program instruction;

determining if entries in the offset register list exceed an indirect-address offset value range; and if the indirect-address offset value range is exceeded, resolving indirect-address offset values entered in the offset register list and outputting low-level program code corresponding to the offset register list.

2. The method of claim 1, wherein the step of examining a program instruction further comprises the steps of:

dynamically allocating the offset register list;

retrieving a block of compiler intermediate code;

retrieving the program instruction from the block of compiler intermediate code; and determining if the program instruction contains an indirect register instruction.

3. The method of claim 1, wherein the step of generating an entry in an offset register list further comprises the steps of:

storing an indirect-address offset value corresponding to the program instruction into the indirect-address offset value;

storing the address of the program instruction into an instruction pointer; and updating a list pointer.

4. The method of claim 1, wherein the step of determining if an indirect-address offset range is exceeded further comprises the steps of:

determining a difference between a maximum indirect-address offset value in the offset register list and a minimum indirect-address offset value in the offset linked list; and determining if the difference is greater than the indirect-address offset range.

5. The method of claim 4, wherein the indirect-address offset range is equal to sixty.

6. The method of claim 1, wherein the step of resolving the indirect offset values further comprises the steps of:

outputting an initial line of low-level program code;

retrieving a linked list entry from the offset linked list;

determining if the retrieved linked list entry is an out-of-range entry; and if the offset value is not the out-of-range entry, resolving the offset value, the step of resolving the offset value further comprising the steps of subtracting a minimum indirect-address offset value for the offset register linked list from the offset value, removing the linked list entry from the offset register linked list, outputting a line of low-level program code for the program instruction, whereby said line of low-level program code contains the resolved offset value, and outputting a final line of low-level program code.

7. The method of claim 6, wherein the initial line of low-level program code is the instruction "add #minimum indirect-address offset value, rx", wherein rx is a register corresponding to the offset linked list.

8. The method of claim 6, wherein the final line of low-level program code is the instruction "add #−minimum indirect-address offset value, rx", wherein rx is a register corresponding to the offset linked list.

9. The method of claim 6, wherein the out-of-range entry is the difference between a maximum indirect-address offset value and the minimum indirect-address offset value in the offset linked list.

10. The method of claim 1, further comprising the steps of:

determining if the program instruction contains a label; and if the program instruction contains a label, traversing a non-empty offset register list, the step of traversing further comprising the steps of determining if a non-empty offset register list exists, retrieving the non-empty offset register list, and resolving indirect offset values in the non-empty offset register list and outputting low-level program code corresponding to the offset register list for each entry in the non-empty offset register list.

11. The method of claim 1, further comprising the steps of:
   determining if any offset register list is non-empty; and
   if any offset register list is non-empty, traversing the non-empty offset register list, the step of traversing further comprising the steps of
      determining if a non-empty offset register list exists,
      retrieving the non-empty offset register list, and
      resolving indirect offset values in the non-empty offset register list and outputting low-level program code corresponding to the offset register list for each entry in the non-empty offset register list.

12. A system for delaying register offset resolution, comprising:
   program code stored in a memory, the program code comprising a set of program instructions;
   a set of offset register lists stored in the memory, each one of the set of offset register lists corresponding to a single register; and
   a compiler for examining the program instructions and entering offset values contained in the program instructions into selected ones of the set of offset register lists.

13. The system of claim 12, wherein the compiler is configured to determine whether a difference between minimum and maximum offset values entered into the selected offset register list exceeds an indirect-address offset range.

14. The system of claim 13 wherein the compiler is configured to generate low-level program code corresponding to the selected offset register list when the indirect-address offset range is exceeded, the low-level program code including resolved indirect-address offset values.

15. The system of claim 14 wherein the resolved indirect-address offset value is the difference between the indirect-address offset value and the minimum offset value.

16. The system of claim 13 wherein the indirect-address offset range is equal to sixty.

17. The system of claim 12 wherein the offset values are four bits in length.

18. The system of claim 12 wherein the offset register lists each include a set of linked list entries, each linked list entry comprising:
   an offset value corresponding to one of the set of program instructions; and
   an instruction pointer corresponding to one of the set of the program instructions.

19. The system of claim 18 wherein the compiler dynamically allocates the linked list entries.

20. The system of claim 12 wherein the offset register lists are linked lists.

21. The system of claim 12 wherein the stored program code comprises compiler intermediate code, and the compiler is configured to optimize the compiler intermediate code into assembler code.

22. A computer-readable medium comprising program instructions for delaying register offset resolution, by performing the steps of:
   examining a program instruction;
   generating an entry in an offset register list, the entry including an indirect offset value corresponding to the examined program instruction;
   determining whether an indirect-address offset range is exceeded in the offset register list; and
   if the offset range is exceeded, resolving indirect offset values entered in the offset register list and outputting low-level program code corresponding to the offset register list.

23. A system for delaying register offset resolution, comprising:
   means for examining a program instruction;
   means for generating an entry in an offset register list, the entry including an indirect offset value corresponding to the examined program instruction;
   means for determining whether an indirect-address offset range is exceeded in the offset register list; and
   means for resolving indirect offset values entered in the offset register list and for outputting low-level program code corresponding to the offset register list if the offset range is exceeded.

* * * * *